US008329352B2

(12) United States Patent
Wang et al.

(10) Patent No.: US 8,329,352 B2
(45) Date of Patent: Dec. 11, 2012

(54) FUEL CELL SYSTEM USING HEAT EXCHANGING ELEMENT

(75) Inventors: Cheng Wang, Hsin-Chu (TW);
Ching-Po Lee, Hsin-Chu (TW);
Chih-Cheng Chou, Hsin-Chu (TW)

(73) Assignee: Young Green Energy Co., Hsinchu County (TW)

( * ) Notice: Subject to any disclaimer, the term of this patent is extended or adjusted under 35 U.S.C. 154(b) by 1173 days.

(21) Appl. No.: 12/180,282

(22) Filed: Jul. 25, 2008

(65) Prior Publication Data
US 2009/0148737 A1 Jun. 11, 2009

(30) Foreign Application Priority Data

Dec. 6, 2007 (TW) .............................. 96146622 A

(51) Int. Cl.
*H01M 8/04* (2006.01)
*F28F 13/00* (2006.01)
(52) U.S. Cl. ......... 429/435; 429/436; 165/136; 165/164
(58) Field of Classification Search .......... 429/400–535; 165/69, 135–136, 164, 901
See application file for complete search history.

(56) References Cited

U.S. PATENT DOCUMENTS

| 5,165,466 | A | * | 11/1992 | Arbabian | 165/4 |
| 5,538,079 | A | * | 7/1996 | Pawlick | 165/153 |
| 5,902,692 | A | | 5/1999 | Batawi | |
| 6,719,037 | B2 | * | 4/2004 | Crook | 165/79 |
| 2004/0146763 | A1 | * | 7/2004 | Pondo et al. | 429/26 |
| 2004/0175605 | A1 | | 9/2004 | Eshraghi et al. | |
| 2006/0246333 | A1 | | 11/2006 | Schaevitz et al. | |
| 2007/0077465 | A1 | * | 4/2007 | Matsuoka et al. | 429/19 |
| 2007/0243439 | A1 | | 10/2007 | Eshraghi et al. | |

FOREIGN PATENT DOCUMENTS

| EP | 0840388 B1 | 8/2008 |
| TW | 411755 | 11/2000 |
| TW | 552841 | 9/2002 |
| TW | 200633622 A | 3/2005 |
| TW | I282401 | 9/2005 |
| TW | M302128 | 6/2006 |
| TW | 10020447770 | 5/2011 |

* cited by examiner

*Primary Examiner* — Basia Ridley
*Assistant Examiner* — Jonathan G Leong
(74) *Attorney, Agent, or Firm* — Chun-Ming Shih

(57) ABSTRACT

A heat exchanging element adapted to a fuel cell system includes a plurality of heat exchanging units and a fixing unit. The heat exchanging units are arranged to be spaced apart from one another along a first direction. The fixing unit fixes the heat exchanging units. Each of the heat exchanging units is demarcated into a first part and a second part extending from the first part by the fixing unit. A thermal conductivity coefficient of each of the heat exchanging units is higher than that of the fixing unit. The fixing unit is configured to slow heat conduction between the heat exchanging units. The heat exchanging element improves a heat recovery efficiency of the fuel cell system. In addition, two kinds of fuel cell systems using the above-mentioned heat exchanging element are provided.

10 Claims, 12 Drawing Sheets

FUEL CELL SYSTEM USING HEAT EXCHANGING ELEMENT

BACKGROUND

1. Technical Field

The present invention generally relates to a heat exchanging element and, particularly, to a heat exchanging element adapted to a fuel cell system and fuel cell systems using the same.

2. Description of the Related Art

A fuel cell generally has the advantages of high efficiency, low noise, non-pollution and so on, so it is a kind of energy technology which is capable of meeting the era trend. Fuel cells usually are classified as several types, such as proton exchange membrane fuel cell (PEMFC) and direct methanol fuel cell (DMFC). Taking a direct methanol fuel cell as an example, a membrane electrode assembly (MEA) thereof primarily is consisted of a cathode, an anode and a proton exchange membrane sandwiched between the cathode and the anode. A fuel (i.e., methanol) fed to the anode reacts with a catalyst to generate hydrogen ions and electrons. A half equation of anode reaction is that: $CH_3OH+H_2O \rightarrow CO_2+6H^++6e^-$.

In addition, the electrons created from the anode reaction flow to the cathode via an external circuit, while the hydrogen ions penetrate through the proton exchange membrane to the cathode and react with the electrons and oxygen gas to generate water. A half equation of cathode reaction is that: $6H^++6e^-+3/2O_2 \rightarrow 3H_2O$.

In the fuel cell technology, the higher a reaction temperature of the fuel cell stack which is consisted of a plurality of membrane electrode assemblies, the higher a reaction efficiency of the fuel cell. Accordingly, a design of heat recovery has been proposed in the prior art. In addition, in the prior art, the water generated at the cathode also is recovered to meet the need of the anode reaction.

FIG. 1 is a schematic view of a conventional direct methanol fuel cell system. As illustrated in FIG. 1, the conventional direct methanol fuel cell system 100 includes a fuel cell stack 110, a heat exchanging element 120, a flow guiding unit 130 and a blower 140. The flow guiding unit 130 connects the fuel cell stack 110, the heat exchanging element 120 and the blower 140. The blower 140 is configured to supply an airflow 50. The flow guiding unit 130 is configured to guide the airflow 50 to flow through the heat exchanging element 120 and the fuel cell stack 110 in sequence, so as to supply oxygen gas to the cathode reaction.

In one aspect, the fuel cell stack 110 generates heat energy when it occurs a reaction, and the airflow 50 flowing to the fuel cell stack 110 absorbs the heat energy (Hereinafter, the airflow 50 has flowed through the fuel cell stack 110 will be denoted by 50'). Subsequently, the airflow 50' is guided to the heat exchanging element 120 by the flow guiding unit 130 and transfers the absorbed heat energy to the heat exchanging element 120 so as to increase a temperature of the heat exchanging element 120. In addition, the airflow 50 flowing from the blower 140 to the heat exchanging element 120 absorbs the heat energy of the heat exchanging element 120, such that a temperature of the airflow 50 which will flow to the fuel cell stack 110 is increased and thus a reaction efficiency of the fuel cell stack 110 is improved.

In another aspect, the airflow 50' flowing through the fuel cell stack 110 carries the water vapor generated by the cathode reaction. The airflow 50 flowing from the blower 140 to the heat exchanging element 120 as a cooling airflow, to assist the water vapor in the airflow 50' to condense into liquid water at the heat exchanging element 120. As a result, the purpose of water recovery is achieved.

However, because a flow rate of the airflow 50 supplied to and required by the fuel cell stack 110 generally is not high, such that it is difficult to supply enough cooling airflow. As a result, the recovered amount of the liquid water is not capable of meeting the need of the anode reaction. Furthermore, the water vapor in the airflow 50' need to be firstly condensed into liquid water before the heat energy in the airflow 50' is transferred to the heat exchanging element 120. Because the temperature of the airflow 50' is decreased after the condensation of the water vapor, the heat energy transferred to the heat exchanging element 120 is correspondingly decreased. Accordingly, the heat recovery efficiency of the conventional fuel cell system 100 is low.

BRIEF SUMMARY

The present invention relates to a heat exchanging element for effectively improving a heat recovery efficiency of a fuel cell system.

The present invention further relates to a fuel cell system for achieving a relatively high heat recovery efficiency and also recovering enough liquid water.

The present invention further relates to another fuel cell system for having substantially identical output power at various different ambient temperatures.

A heat exchanging element, in accordance with a present embodiment of the present invention, is provided. The heat exchanging element is adapted to a fuel cell system and includes a plurality of heat exchanging units and a fixing unit. The heat exchanging units are arranged to be spaced apart from one another along a first direction. The fixing unit fixes the heat exchanging units. Each of the heat exchanging units is demarcated into a first part and a second part extending from the first part by the fixing unit. A thermal conductivity coefficient of each of the heat exchanging units is higher than that of the fixing unit. The fixing unit is capable of slowing the heat conduction between the heat exchanging units.

A fuel cell system in accordance with another present embodiment of the present invention is provided. The fuel cell system includes a fuel cell stack, a first airflow generator, a first heat exchanging module, a second heat exchanging module and a flow guiding unit. The first airflow generator is configured (i.e., structured and arranged) to supply an airflow. The first heat exchanging module is arranged between the fuel cell stack and the first airflow generator. The second heat exchanging module is arranged between the first airflow generator and the first heat exchanging module. The first heat exchanging module and the second heat exchanging module each includes at least one the above mentioned heat exchanging element. The flow guiding unit connects the fuel cell stack, the first airflow generator, the first heat exchanging module and the second heat exchanging module to allow the airflow to flow through the second heat exchanging module, the first heat exchanging module, the fuel cell stack, the first heat exchanging module and the second heat exchanging module in sequence and then to be exhausted out of the flow guiding unit. The flow guiding unit has a bypass port formed a sidewall of the flow guiding unit and arranged between the first heat exchanging module and the second heat exchanging module. The bypass port is configured to guide a part of the airflow flowing from the second heat exchanging module to the first heat exchanging module out of the flow guiding unit.

A fuel cell system in accordance with still another present embodiment of the present invention is provided. The fuel cell system includes a fuel cell stack, a first heat exchanging module, a first airflow generator, a second heat exchanging module and a flow guiding unit. The first heat exchanging module includes a plurality of the above mentioned heat exchanging elements. The first airflow generator is arranged between the fuel cell stack and the first heat exchanging module and adapted to supply an airflow to the fuel cell stack. The second heat exchanging module is arranged beside the first heat exchanging module. The second heat exchanging module includes at least one the above mentioned heat exchanging element. The flow guiding unit connects the fuel cell stack and the first heat exchanging module. The flowing guiding unit has a plurality of valve groups formed in a sidewall of the flowing guiding unit and being corresponding to respective the heat exchanging elements of the first heat exchanging module. Each of the valve groups includes at least two valves opposite to each other. The flow guiding unit is configured to allow the airflow to flow through the first heat exchanging module, the fuel cell stack and the first heat exchanging module in sequence and then to flow to the first parts of the heat exchanging units of the heat exchanging element of the second heat exchanging module via one of the valve groups.

Due to the fact that the present heat exchanging element uses a fixing unit with the low thermal conductivity coefficient to block (or slow) at least an axial heat conduction, when it is applied into counter flow systems, a heat exchange efficiency of the counter flow systems is improved. Accordingly, the fuel cell systems using the present heat exchanging element achieves a relatively high heat recovery efficiency. Furthermore, in one of the present fuel cell systems, because a flow rate of an airflow supplied by the first airflow generator is higher than that of the airflow flowing through the fuel cell stack, such that there is enough cooling airflow is supplied and thus enough liquid water is recovered. In addition, another one of the present fuel cell systems adjusts an amount of the heat exchanging elements of the first heat exchanging module which operatively occur heat exchange at different ambient temperatures by means of switching the on-off states of the valve groups, such that approximately identical output powers are provided.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
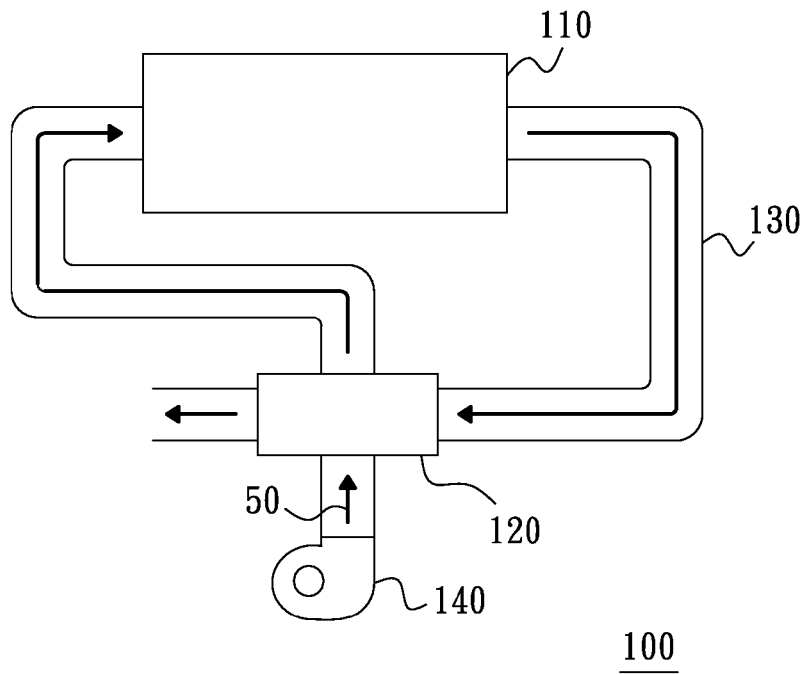
FIG. 1 is a schematic view of a conventional direct methanol fuel cell system.
Figure 2:
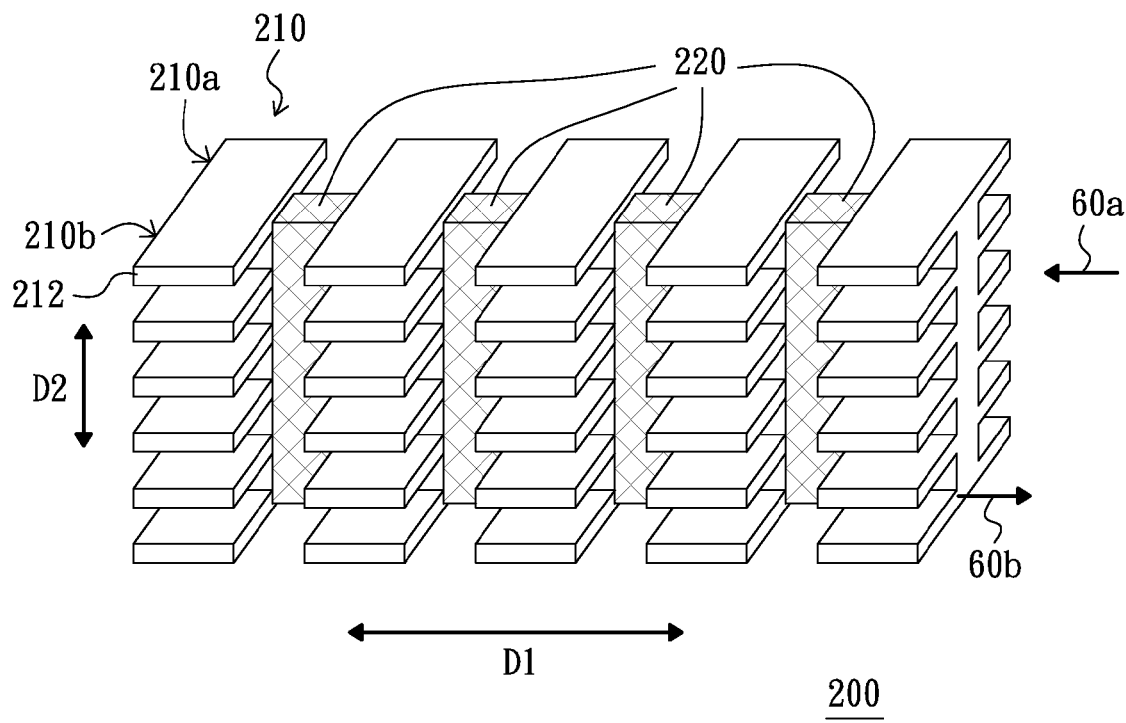
FIG. 2 is a schematic three-dimensional view of a heat exchanging element, in accordance with a present embodiment of the present invention.
Figure 3:
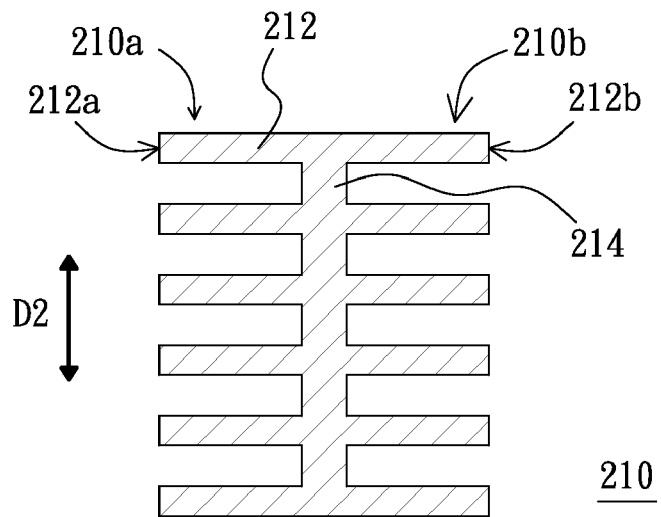
FIG. 3 is a schematic view of a heat exchanging unit of FIG. 2.

FIG. 2 is a schematic three-dimensional view of a heat exchanging element in accordance with a present embodiment of the present invention. FIG. 3 is a schematic view of a heat exchanging unit of FIG. 2. As illustrated in FIGS. 2 and 3, the heat exchanging element 200 is adapted to a fuel cell system. The heat exchanging element 200 includes a plurality of heat exchanging units 210 and a fixing unit 220. The heat exchanging units 210 are arranged to be spaced apart from one another along a first direction D1. The fixing unit 220 fixes the heat exchanging units 210. Each of the heat exchanging units 210 is demarcated into a first part 210a and a second part 210b extending from the first part 210a by the fixing unit 220. A thermal conductivity coefficient of each of the heat exchanging units 210 is higher than that of the fixing unit 220. In other words, the heat exchanging units 210 are made of a high heat conductive material, such as copper or aluminum; while the fixing unit 220 is made of a low heat conductive material, such as plastic or rubber. For the purpose of illustration, the heat exchanging units 210 are made of material with a thermal conductivity coefficient about larger than 50 W/mK (watt per meter Kevin), the fixing unit 220 is made of material with a thermal conductivity coefficient about smaller than 20 W/mK.

Each of the heat exchanging units 210 includes, for example, a plurality of fins 212 and a connecting portion 214. The fins 212 are arranged to be spaced apart from one another along a second direction D2 to be multilayered. The first direction D1 is substantially perpendicular to the second direction D2. The connecting portion 214 connects the fins 212. Two ends 212a, 212b of each of the fins 212 are respectively located at two sides of the connecting portion 214 as well as two sides of the fixing unit 220.

In the illustrated embodiment, the fixing unit 220 is connected between each two adjacent connecting portions 214. The fixing unit 220 is used to prevent the airflow 60a which flows through the first part 210a of the heat exchanging units 210 from flowing to the second part 210b thereof, and also prevent the airflow 60b which flows through the second part 210b of the heat exchanging units from flowing to the first part 210a thereof. In addition, because the fixing unit 220 is made of material with a low thermal conductivity coefficient, the heat conduction between the heat exchanging units 210 along the first direction D1 is further lowered.

The heat exchanging element 200 in accordance with the present embodiment is used in a counter flow system to improve a heat exchanging efficiency. The term, "counter flow" refers to two flows whose flow directions face away from each other. Various embodiments with respect to how to apply the present heat exchanging element 200 into counter flow systems will now be described in detail below with reference to the drawings, but they will not limit the applications of the present heat exchanging element 200.

Figure 4:
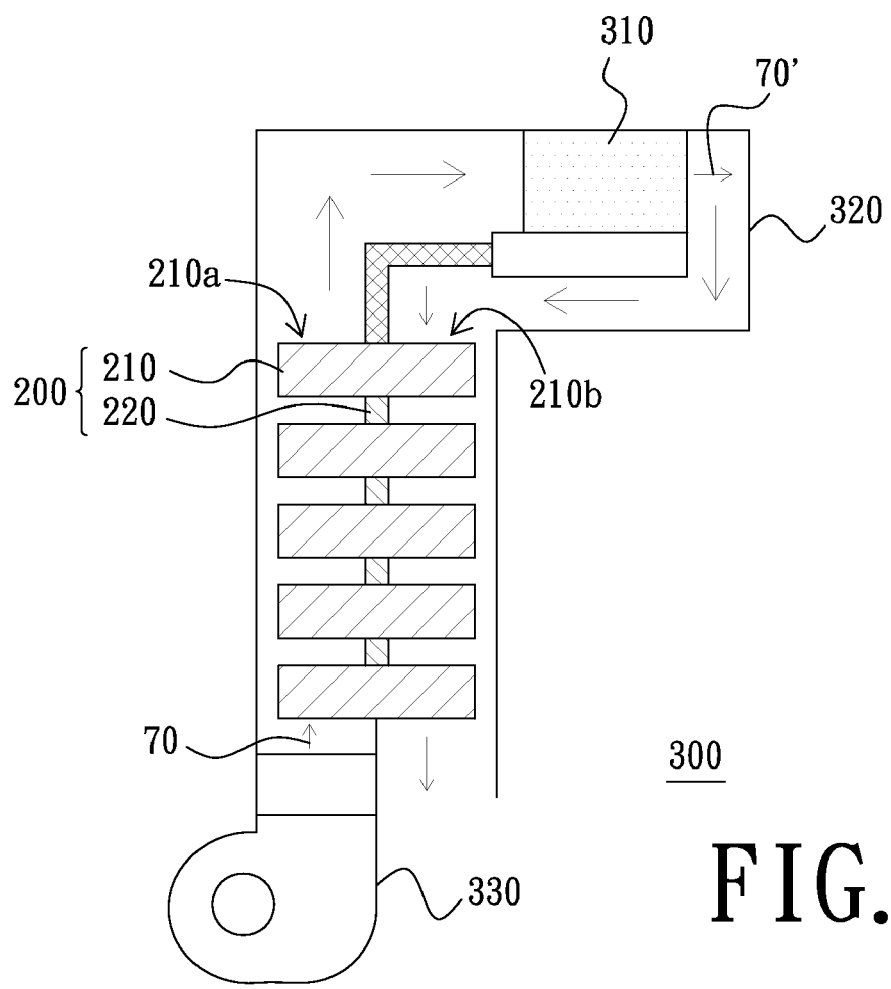
FIG. 4 is a schematic view of a fuel cell system, in accordance with an embodiment of the present invention.

FIG. 4 is a schematic view of a fuel cell system in accordance with a present embodiment of the present invention. As illustrated in FIG. 4, the fuel cell system 300 is a kind of counter flow system. The fuel cell system 300 includes a fuel cell stack 310, a flow guiding unit 320, an airflow generator 330 and the heat exchanging element 200 as above mentioned. The flow guiding unit 320 connects the fuel cell stack 310, the heat exchanging element 200 and the airflow generator 330. The airflow generator 330 may be a blower and is configured to supply an airflow 70. The flow guiding unit 320 is configured to guide the airflow 70 to flow through the first parts 210a of the heat exchanging units 210 of the heat exchanging element 200 and the fuel cell stack 310 in sequence, so as to supply oxygen gas for a cathode reaction of the fuel cell stack 310. Hereinafter, the airflow flowing through the fuel cell stack 310 is denoted by 70'.

In one aspect, the airflow 70' flowing through the fuel cell stack 310 carries the water vapor generated by the cathode reaction. The airflow 70 flowing from the airflow generator 330 to the heat exchanging element 200 acts as a cooling airflow to assist the water vapor in the airflow 70' to condense into liquid water at the location of the heat exchanging units 210. As a result, the purpose of water recovery is achieved.

In another aspect, the fuel cell stack 310 generates heat energy when it occurs a reaction, the airflow 70 flowing to the fuel cell stack 310 absorbs the heat energy. Subsequently, the airflow 70' flowing through the fuel cell stack 310 is guided to the second parts 210b of the heat exchanging units 210 of the heat exchanging element 200 by the flow guiding unit 320 and transfers the absorbed heat energy to the heat exchanging units 210 so as to increase a temperature of the heat exchanging units 210. In addition, the airflow 70 flowing from the airflow generator 330 to the first parts 210a of the heat exchanging units 210 absorbs the heat energy of the heat exchanging units 210 so as to increase the temperature of the airflow 70 flowing to the fuel cell stack 310. Therefore, the reaction temperature of the fuel cell stack 310 is increased and thus a reaction efficiency of the fuel cell stack 310 is improved.

Generally speaking, the larger a temperature difference between two substances, the better the heat exchange effect. In this embodiment, because the fixing unit 220 is made of material (e.g., plastic or rubber) with a low thermal conductivity coefficient, the heat energy of each of the heat exchanging units 210 is prevented from flowing to another heat exchanging unit 210. In addition, when the airflow 70' sequentially flows through the heat exchanging units 210, the heat energy absorbed by respective the heat exchanging units 210 is gradually decreased. So that the shorter a distance from one of the heat exchanging units 210 to the fuel cell stack 310, the higher the temperature of the corresponding heat exchanging unit 210; whereas the shorter a distance from one of the heat exchanging units 210 to the airflow generator 330, the lower the temperature of the corresponding heat exchanging unit 210.

Although the heat exchanging units 210 relatively nearer to the airflow generator 330 has a low temperature, the airflow 70 before flowing through the heat exchanging element 200 has a relatively lower temperature. Therefore, a definite temperature difference is still existed between the airflow 70 and the heat exchanging unit 210 nearest to the airflow generator 330, which facilitates the airflow 70 to absorb the heat energy of the nearest heat exchanging unit 210. Likewise, each of the other heat exchanging units 210 also has a definite temperature difference with the airflow 70 flowing thereto, so that the airflow 70 is continuously capable of absorbing the heat energy of each of the heat exchanging units 210. Consequently, the temperature of airflow 70 flowing to the fuel cell stack 310 is effectively increased, the reaction temperature of the fuel cell stack 310 is correspondingly increased and thus the reaction efficiency of the fuel cell stack 310 is improved.

Figure 5:
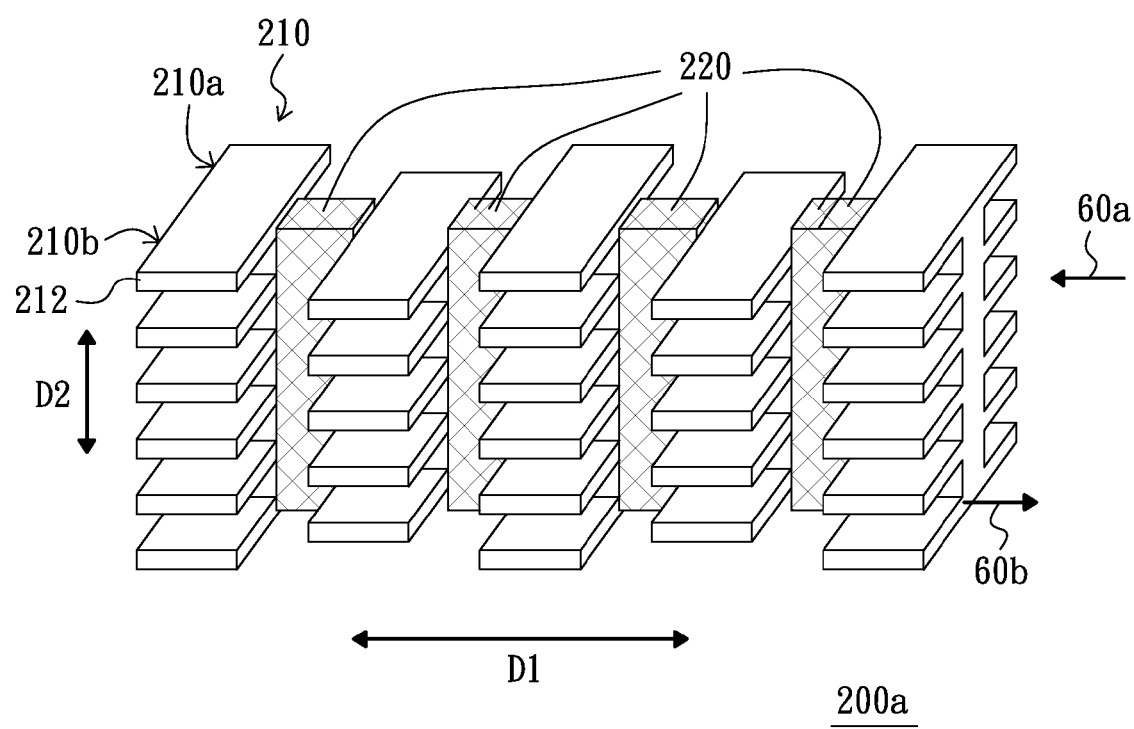
FIG. 5 is a schematic three-dimensional view of a heat exchanging element, in accordance with another present embodiment of the present invention.

FIG. 5 is a schematic three dimensional view of a heat exchanging element in accordance with another present embodiment of the present invention. As illustrated in FIG. 5, the heat exchanging element 200a is similar to the above described heat exchanging element 200, what difference is that: for each two adjacent heat exchanging units 210 of the heat exchanging element 200a, the fins 212 of one heat exchanging unit 210 are corresponding to respective gaps formed between the fins 212 of the other one heat exchanging unit 210.

Figure 6A:
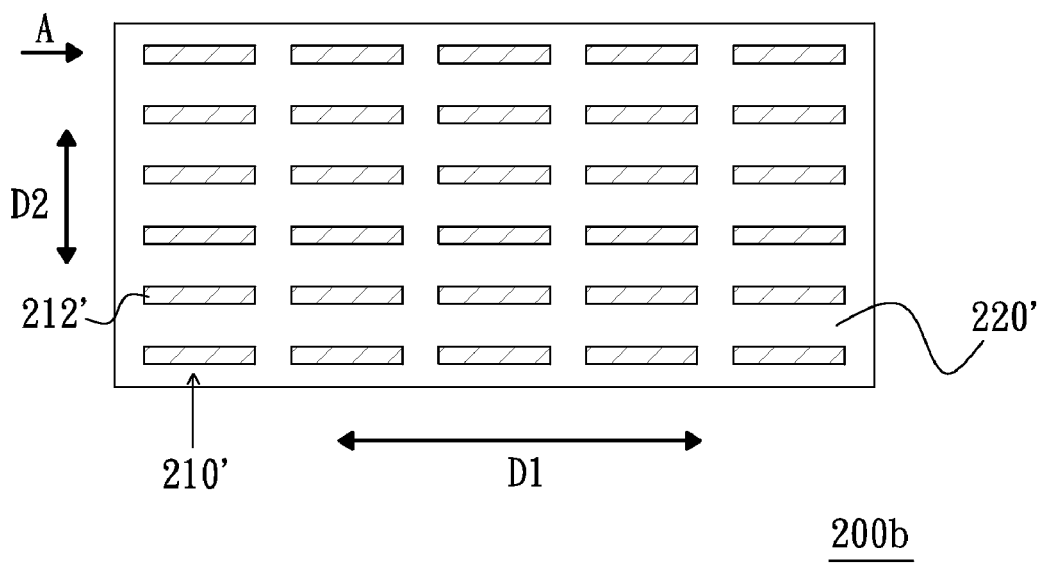
FIG. 6A is a schematic side view of a heat exchanging element, in accordance with still another present embodiment of the present invention.
Figure 6B:
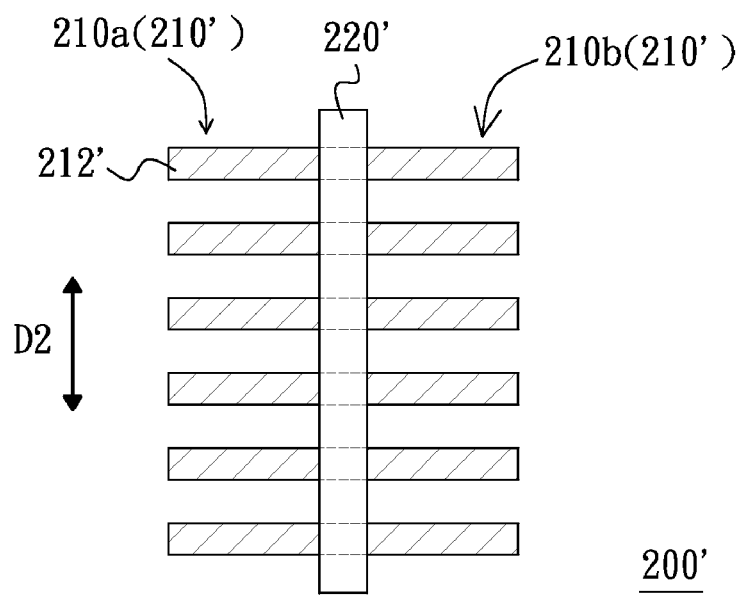
FIG. 6B is a schematic side view of the heat exchanging element of FIG. 6A viewed from the side indicated by arrow A.

FIG. 6A is a schematic side view of a heat exchanging element in accordance with still another present embodiment of the present invention. FIG. 6B is a side view of the heat exchanging element from the side indicated by the arrow A in FIG. 6A. As illustrated in FIGS. 6A and 6B, the heat exchanging element 200b is similar to the above mentioned heat exchanging element 200, what difference is that: each of heat exchanging units 210' of the heat exchanging element 200b only includes a plurality of fins 212' arranged to be spaced apart from one another along the second direction D2 to be multilayered. The fins 212' of each of the heat exchanging units 210' is fixed via the fixing unit 220 but not the connecting portion 214 as illustrated in FIG. 3, so that two ends of each of the fins 212' are respectively located two sides of the fixing unit 220'. In other words, there is no heat conduction between the fins 210' of each of the heat exchanging units 210'.

In this embodiment, besides the heat exchanging units 210' have no heat conduction therebetween, the fins 210' of each of the heat exchanging units 210' also have no heat conduction therebetween, the heat conduction along the two directions (i.e., D1 and D2) are blocked off by the fixing unit 220'. Accordingly, when the heat exchanging element 200b is applied to a counter flow system, a heat exchanging efficiency is further improved.

Figure 7:
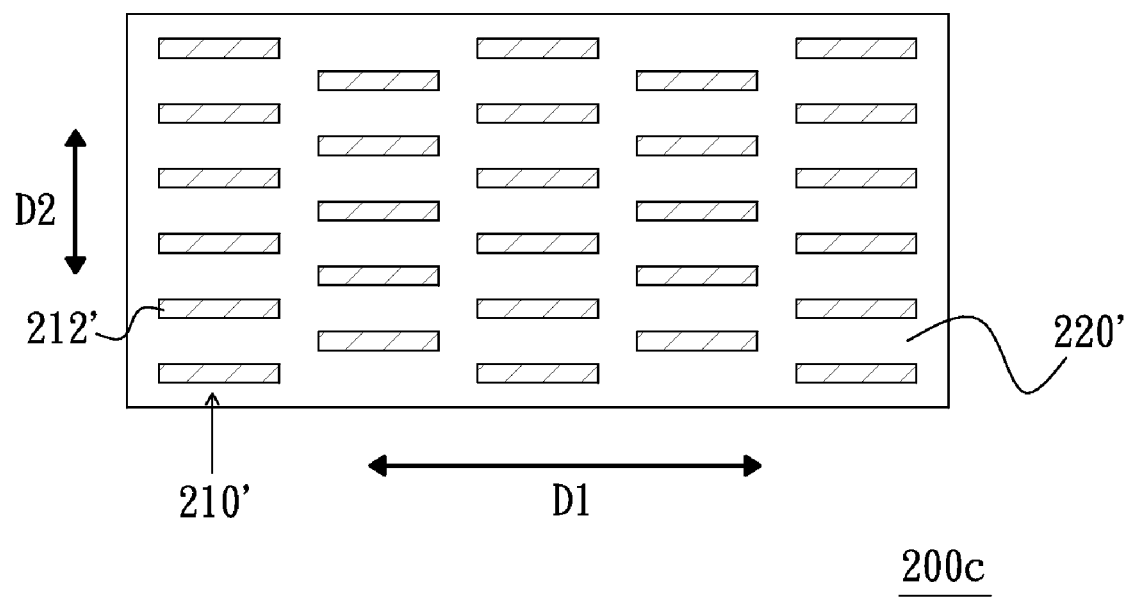
FIG. 7 is a schematic side view of a heat exchanging element, in accordance with even still another present embodiment of the present invention.

FIG. 7 is a schematic side view of a heat exchanging element in accordance with even still another present embodiment of the present invention. As illustrated in FIG. 7, the heat exchanging element 200c is similar to the above described heat exchanging element 200, what difference is that: for each two adjacent heat exchanging units 210' of the heat exchanging element 200c, the fins 212' of one heat exchanging unit 210' are corresponding to respective gaps formed between the fins 212' of the other one heat exchanging unit 210'.

Figure 8:
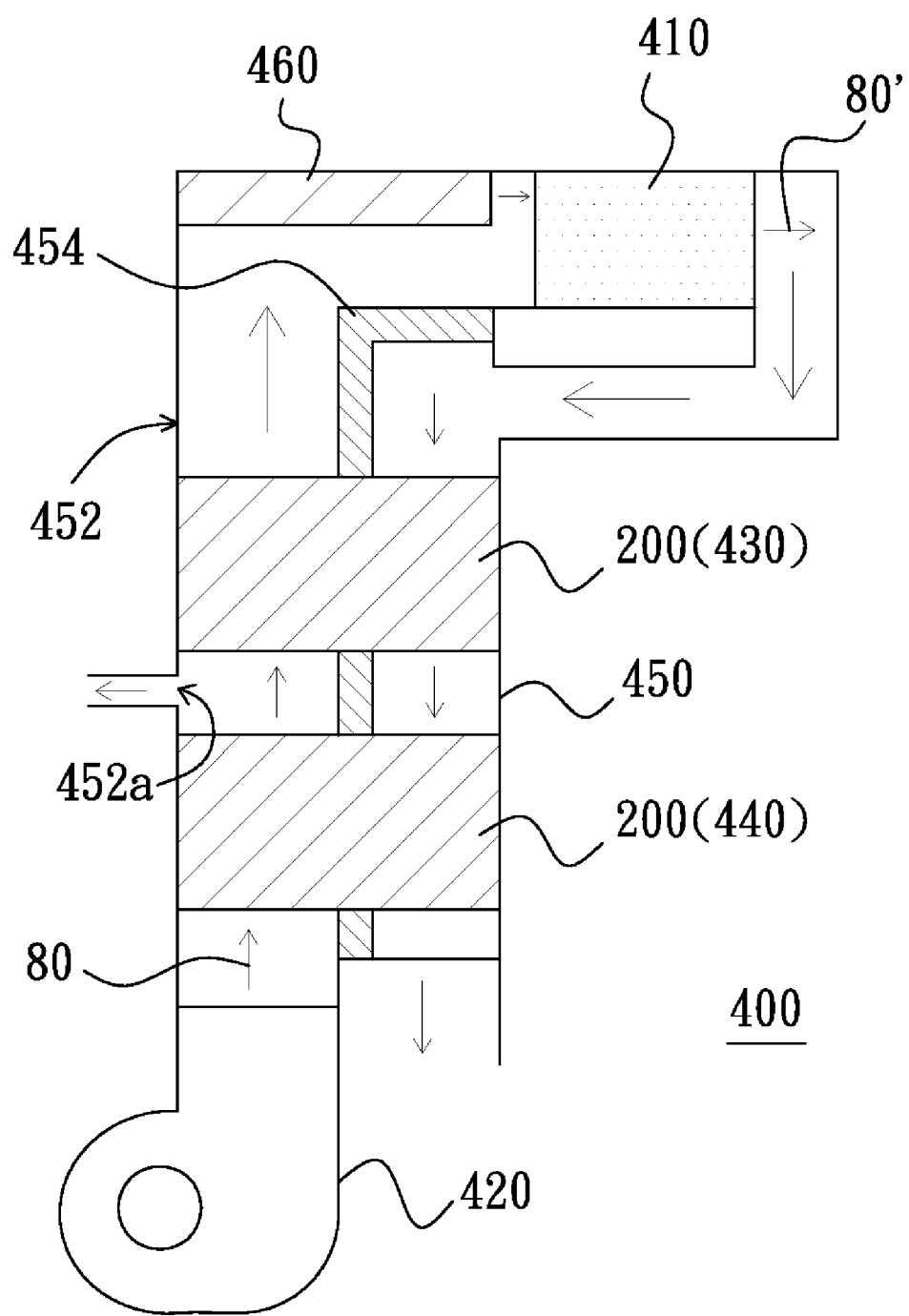
FIG. 8 is a schematic view of a fuel cell system in accordance with another present embodiment of the present invention.

FIG. 8 is a schematic view of a fuel cell system in accordance with another present embodiment of the present invention. As illustrated in FIG. 8, the fuel cell system 400 includes a fuel cell stack 410, a first airflow generator 420, a first heat exchanging module 430, a second heat exchanging module 440 and a flow guiding unit 450. The first airflow generator 420 may be a blower, an axial fan or a pump and adapted to generate an airflow 80. The first heat exchanging module 430 is arranged between the fuel cell stack 410 and the first airflow generator 420. The second heat exchanging module 440 is arranged between the first airflow generator 420 and the first heat exchanging module 430. The first heat exchanging module 430 may be the foregoing heat exchanging element 200 (as illustrated in FIGS. 2 and 3), heat exchanging element 200a (as illustrated in FIG. 5), heat exchanging element 200b (as illustrated in FIGS. 6A and 6B) or heat exchanging element 200c (as illustrated in FIG. 7). For the purpose of illustration, the first heat exchanging module 430 illustrated in FIG. 8 is the heat exchanging element 200. The second heat exchanging module 440 may be the foregoing heat exchanging element 200, heat exchanging element 200a, heat exchanging element 200b or heat exchanging element 200c. For the purpose of illustration, the second heat exchanging module 440 illustrated in FIG. 8 is the heat exchanging element 200.

The flow guiding unit 450 connects the fuel cell stack 410, the first airflow generator 420, the first heat exchanging module 430 and the second heat exchanging module 440 to allow the airflow 80 to flow through the second heat exchanging module 440, the first heat exchanging module 430, the fuel cell stack 410, the first heat exchanging module 430 and the second heat exchanging module 440 in sequence and then to be exhausted out of the flow guiding unit 450. Similar to the foregoing embodiment, hereinafter, the airflow has flowed through the fuel cell stack 410 is denoted by 80'. In addition, the flow guiding unit 450 has a bypass port 452a formed on a sidewall 452 of the flow guiding unit 450. The bypass port 452a is located between the first heat exchanging module 430 and the second heat exchanging module 440 to guide a part of the airflow 80 flowing from the second heat exchanging module 440 to the first heat exchanging module 430 out of the flow guiding unit 450. Therefore, a flow rate of the airflow 80 flowing to the fuel cell stack 410 meets the need.

Advantageously, the fuel cell system 400 further includes a second airflow generator 460. The second airflow generator 460 connects the flow guiding unit 450 and is arranged between the fuel cell stack 410 and the first heat exchanging module 430. The second airflow generator 460 may be a blower, an axial fan or a pump and is configured to guide the airflow 80 to the fuel cell stack 410. Furthermore, the flow guiding unit 450 has a separation portion 454 arranged between the first airflow generator 420 and the fuel cell stack 410. The separation portion 454 may be made of a low thermal conductivity coefficient material, such as plastic, foam or silicon rubber. The first parts 210a of the heat exchanging units 210 of the heat exchanging elements 200 of the first and the second heat exchanging modules 430, 440 are located at a side (e.g., left side) of the separation portion 454. The second parts 210b of the heat exchanging units 210 of the heat exchanging elements 200 of the first and the second heat exchanging modules 430, 440 are located at another side (e.g., right side) of the separation portion 454. The airflow 80 flowing from the first airflow generator 420 to the fuel cell stack 410 flows through the first parts 210a, and the airflow 80' flowing from the fuel cell stack 410 to outside of the flow guiding unit 450 flows through the second parts 210b.

The fuel cell system 400 in accordance with the present embodiment is endowed with better heat recovery efficiency and water recovery efficiency. As to the heat recovery, similar to the heat recovery manner in the foregoing fuel cell system 300, what difference is that the fuel cell system 400 includes two heat exchanging modules (i.e., the first heat exchanging module 430 and the second heat exchanging module 440), such that the airflow 80 flowing to the fuel cell stack 410 is sequentially capable of absorbing the heat energy of the first heat exchanging module 430 and the second heat exchanging module 440. Because the airflow 80 encounters two temperature rising stages, the reaction temperature of the fuel cell stack 410 is effectively increased and thus a reaction efficiency of the fuel cell stack 410 is improved.

Regarding the water recovery, the airflow 80' flowing through the fuel cell stack 410 will carry the water vapor generated by a cathode reaction. The carried water vapor in the airflow 80' then is condensed into liquid water at the locations of the first and the second heat exchanging modules 430, 440. Furthermore, because a flow rate of the airflow 80 (which has not yet arrived at the bypass port 452a) flowing to the second heat exchanging module 440 is relatively larger and thus is capable of supplying enough cooling airflow to allow much more water vapor in the airflow 80' to condense into liquid water at the location of the second heat exchanging module 440. Accordingly, the fuel cell system 400 achieves a better water recovery efficiency, such that a higher concentration of fuel (e.g., methanol) is used to increase a power density (unit: Wh/c.c.) of the fuel cell system 400.

It is indicated that the design of two staged heat and water recoveries make a humidity of the airflow 80 flowing to the fuel cell stack 410 to be more lower than an ambient humidity outside of the flow guiding unit 450, the water vapor in the fuel cell stack 410 is sufficiently absorbed, such that it avoids the occurrence of a water flooding phenomenon in the fuel cell stack 410.

Figure 9:
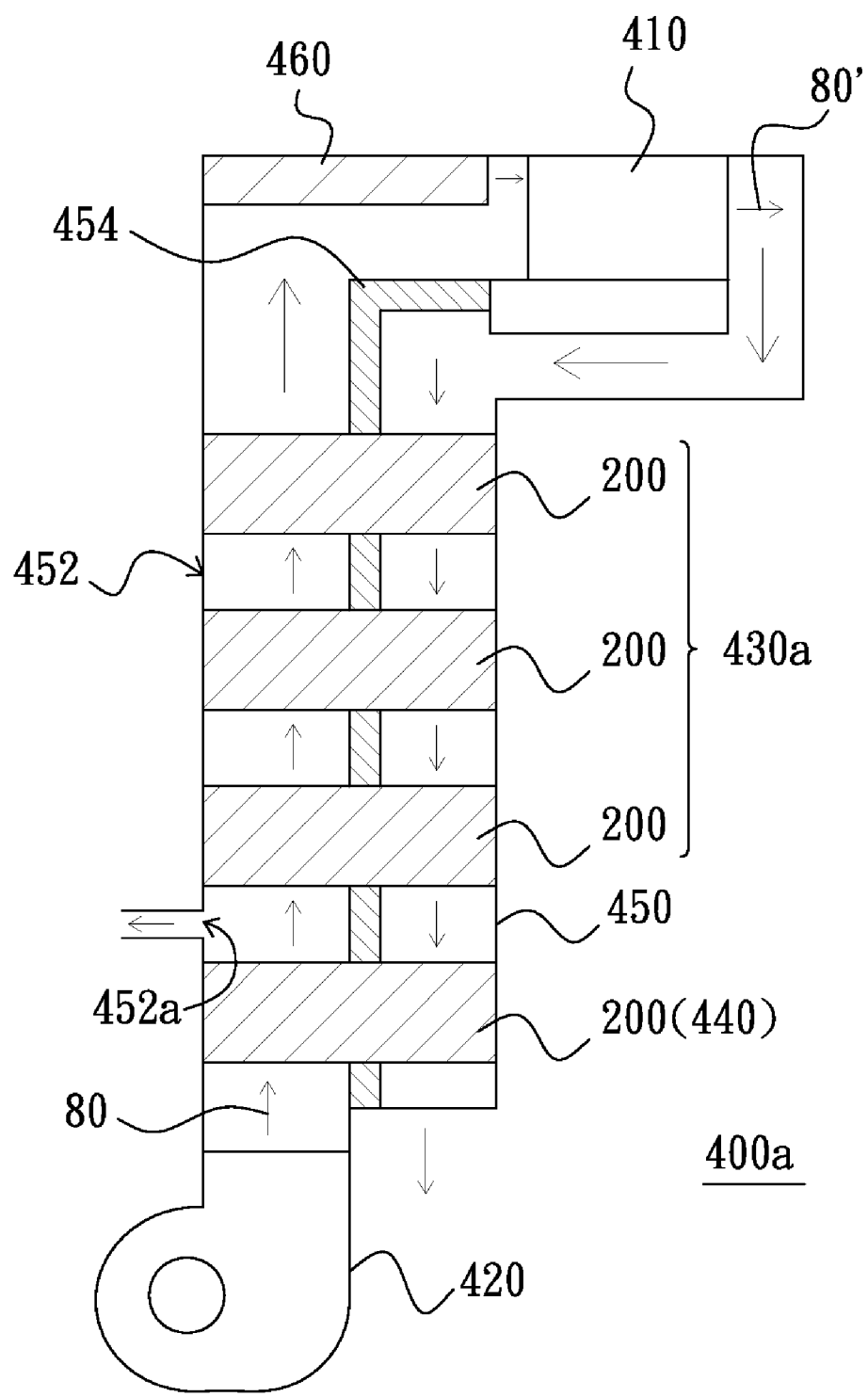
FIG. 9 is a schematic view of a fuel cell system in accordance with still another present embodiment of the present invention.

FIG. 9 is a schematic view of a fuel cell system in accordance with still another present embodiment of the present invention. As illustrated in FIG. 9, the fuel cell system 400a is similar to the fuel cell system 400 illustrated in FIG. 8, what difference is that: a first heat exchanging module 430*a* of the fuel cell system 400*a* includes a plurality of the heat exchanging elements 200 or the heat exchanging elements 200*b*. For the purpose of illustration, the first heat exchanging module 430*a* includes a plurality of the heat exchanging elements 200. Because the fuel cell system 400*a* has much more the heat exchanging elements 200, the heat recovery efficiency is improved, such that it further increases the reaction temperature of the fuel cell stack 410 and thereby improves the reaction efficiency of the fuel cell stack 410. Furthermore, the second heat exchanging module 440 also includes a plurality of the heat exchanging elements 200 and the heat exchanging elements 200*b*.

Figure 10A:
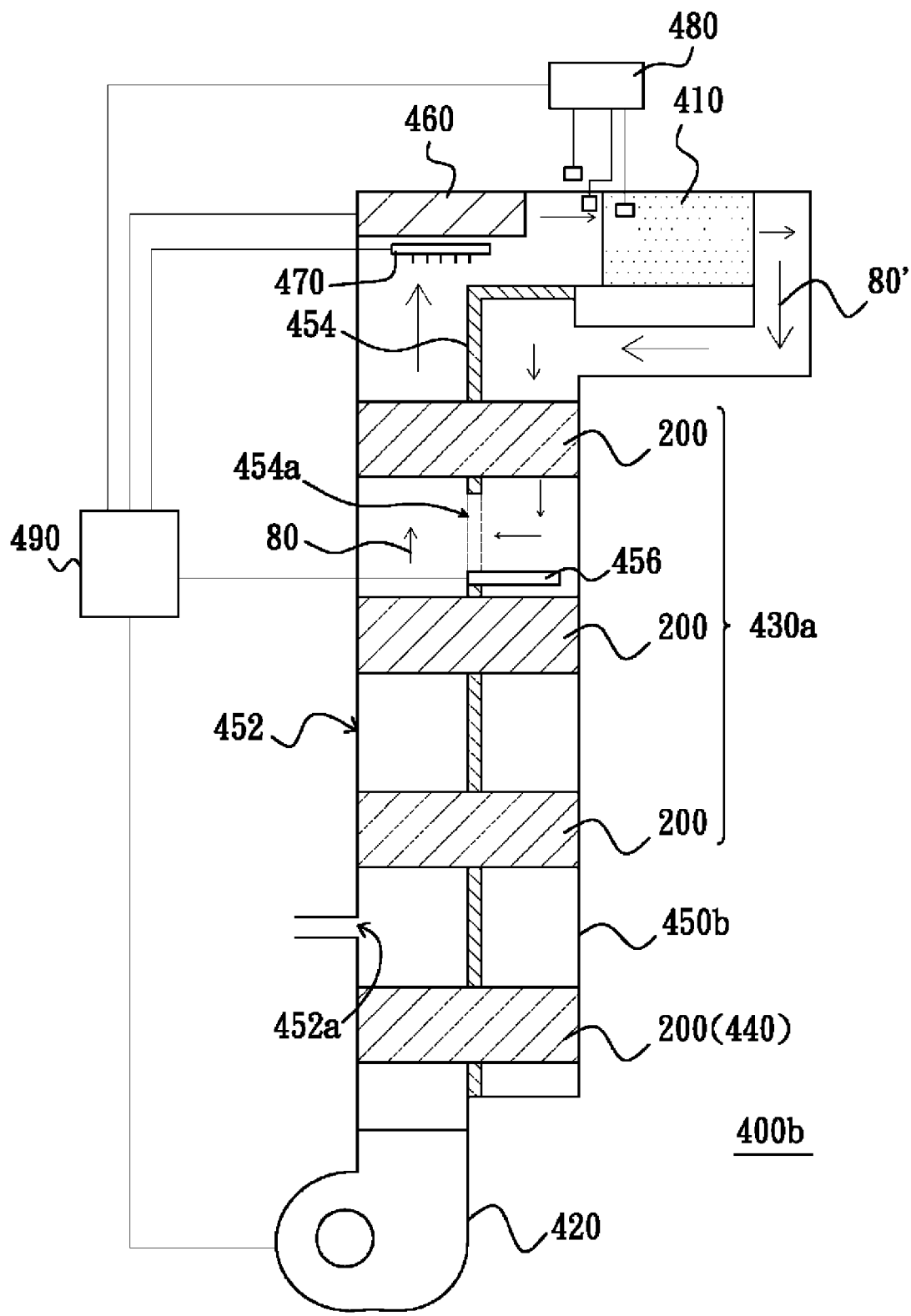
FIGS. 10A and 10B respectively shows different states of a fuel cell system, in accordance with even still another present embodiment.
Figure 10B:
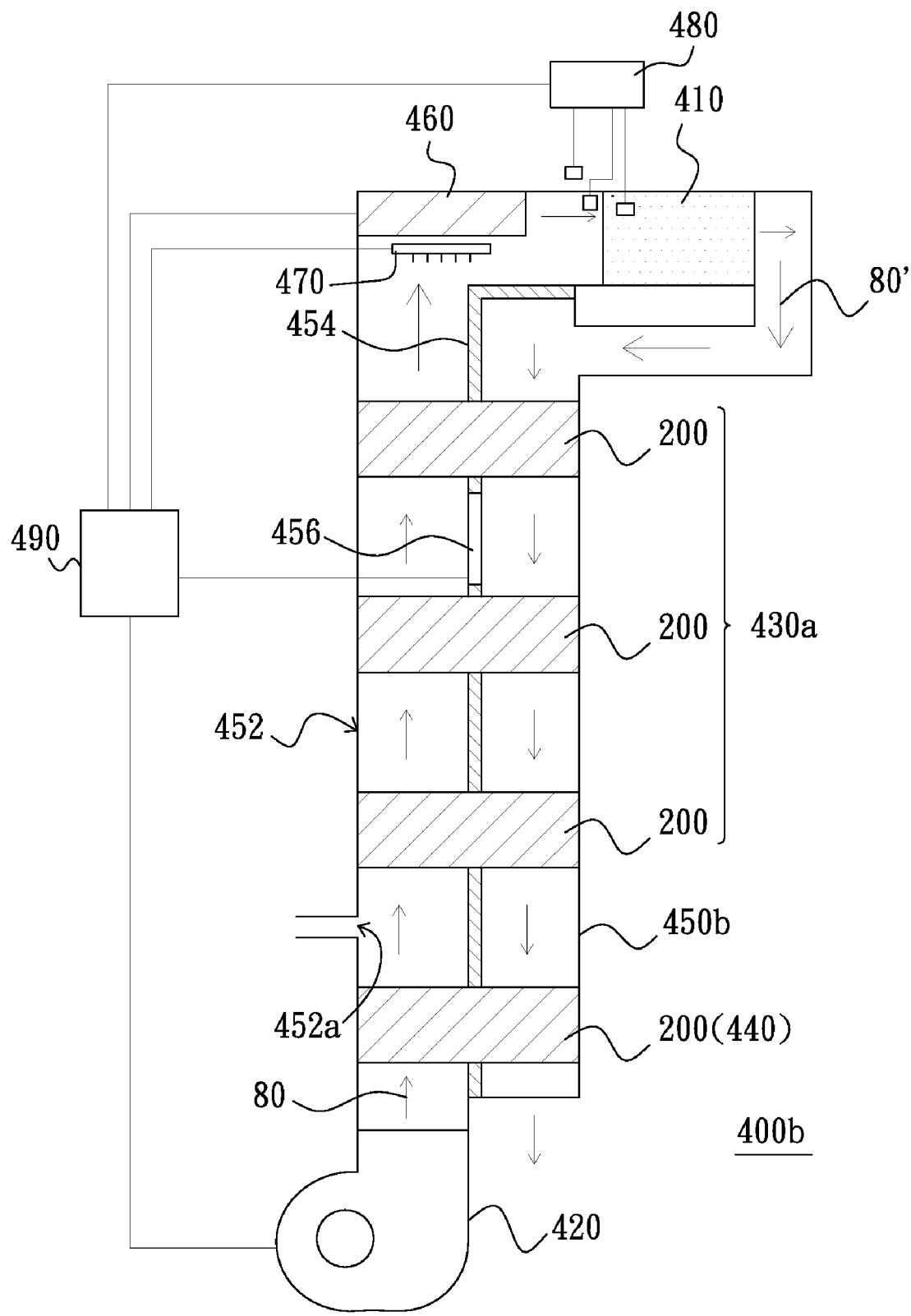

FIGS. 10A and 10B respectively show different states of a fuel cell system in accordance with even still another present embodiment of the present invention. As illustrated in FIGS. 10A and 10B, the fuel cell system 400*b* is similar to the fuel cell system 400*a* of FIG. 9, what difference is that: the fuel cell system 400*b* further includes a heater 470 arranged beside the second airflow generator 460. Furthermore, the flow guiding unit 450*b* still further includes a valve 456 arranged at an opening 454*a* of the separation portion 454. The opening 454*a* is arranged between two heat exchanging elements 200 of the first heat exchanging module 430*a* adjacent to the fuel cell stack 410. In addition, the fuel cell system 400*b* further includes a detecting unit 480 and a control unit 490. The detecting unit 480 is configured to detect an oxygen content of an airflow flowing to the fuel cell stack 410, a temperature of the fuel cell stack 410 and an ambient temperature outside of the flow guiding unit 450*b*. The control unit 490 electrically connects to the detecting unit 480, the heater 470, the valve 456, the first airflow generator 420 and the second airflow generator 460 to switch the on-off states of the heater 470, the valve 456, the first airflow generator 420 and the second airflow generator 460, based upon a detection result from the detecting unit 480.

More specifically, as illustrated in FIG. 10A, when the fuel cell system 400*b* is started up at a low temperature, the fuel cell stack 410 does not enter an activation process. At the time, the control unit 490 switches on the heater 470, the second airflow generator 460 and the valve 456. Because the valve 456 is switched on, the airflow 80' flowing through the first one of the heat exchanging elements 200 (i.e., the uppermost heat exchanging element 200 in FIG. 10A) flows through the opening 454*a*. Therefore, the airflows 80, 80' respectively flowing in and out the fuel cell stack 410 cooperatively form a closed-loop, which results in the heat generated from the fuel cell stack 410 and the heater 470 recycled in the closed-loop. As a result, a temperature rising speed of the fuel cell stack 410 is accelerated and thus the fuel cell stack 410 is quickly heated to the normal operation temperature.

In addition, referring to FIG. 10B, before the fuel cell stack 410 arrives at the normal operation temperature, if the detecting unit 480 detects the oxygen contents of the airflows 80, 80' in the closed loop are not enough, the control unit 490 will switch off the valve 456 so as to make the airflows 80, 80' to flow along a normal flowing path. At the time, the airflows 80, 80' occur heat exchange at the locations of the first and the second heat exchanging modules 430*a*, 440 and thus the loss of heat energy is decreased. In addition, at the current state, the control unit 490 controls a flow rate of the airflow supplied by the first airflow generator 420 approximately identical to that of the airflow supplied by the second airflow generator 460, or switch off the first airflow generator 420 while switch on the second airflow generator 460.

When the oxygen contents of the airflows 80, 80' are enough but the fuel cell stack 410 does not arrive at the normal operation temperature, the control unit 490 switches on the valve 456 again (as illustrated in FIG. 10A). In other words, before the fuel cell stack 410 does not arrive at the normal operation temperature, the fuel cell system 400*b* is switched between the two states shown in FIGS. 10A and 10B until the fuel cell stack 410 arrives at the normal operation temperature.

When the detecting unit 480 detects the fuel cell stack 410 arrives at the normal operation temperature, the control unit 490 switches off the valve 456. At the time, an operational state of the fuel cell system 400*b* is substantially identical to that of the fuel cell system 400*a* illustrated in FIG. 9 and thus it will not repeat herein.

Figure 11A:
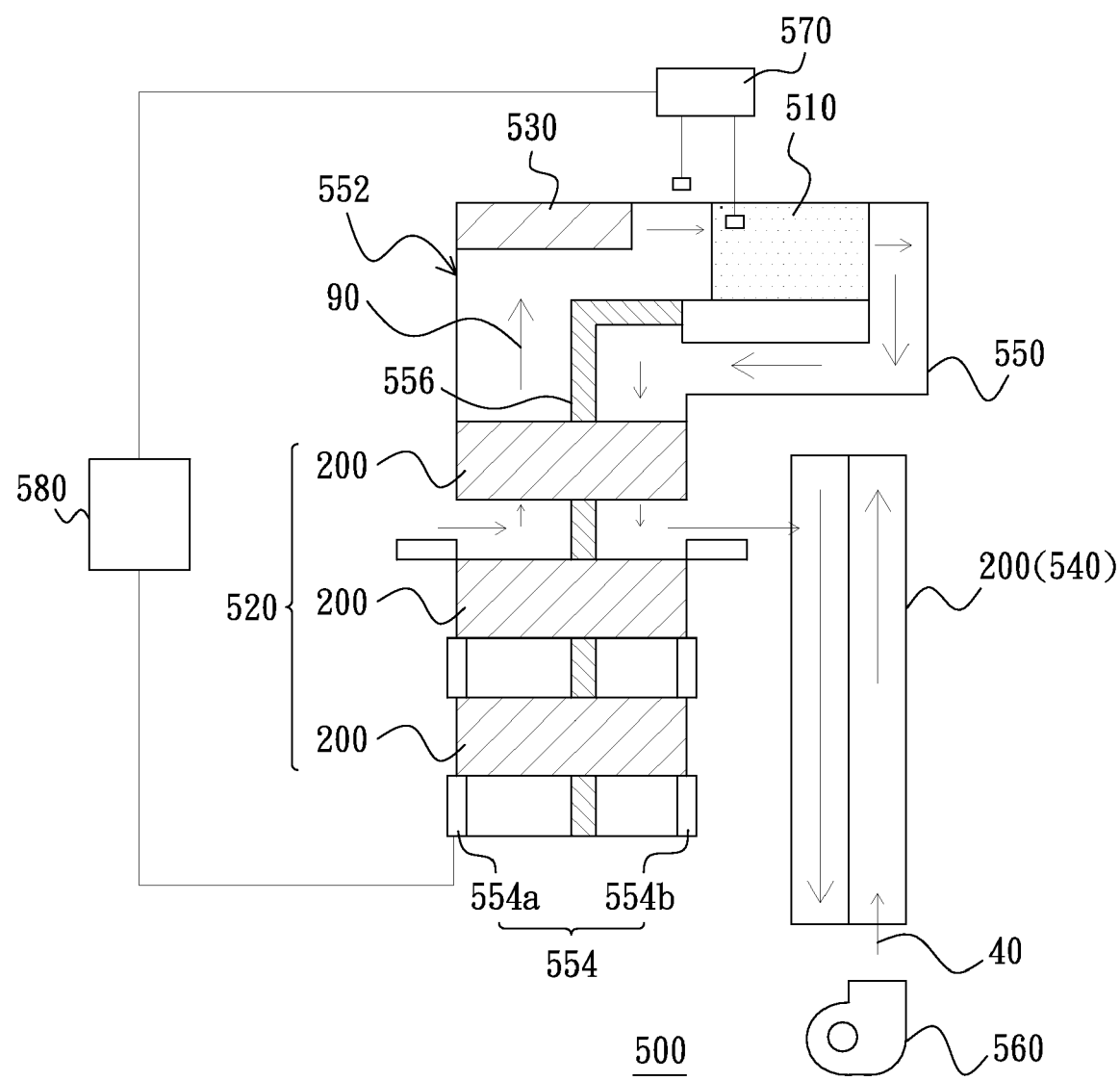
FIGS. 11A through 11C respectively shows different states of a fuel cell system, in accordance with even further still another present embodiment of the present invention.
Figure 11B:
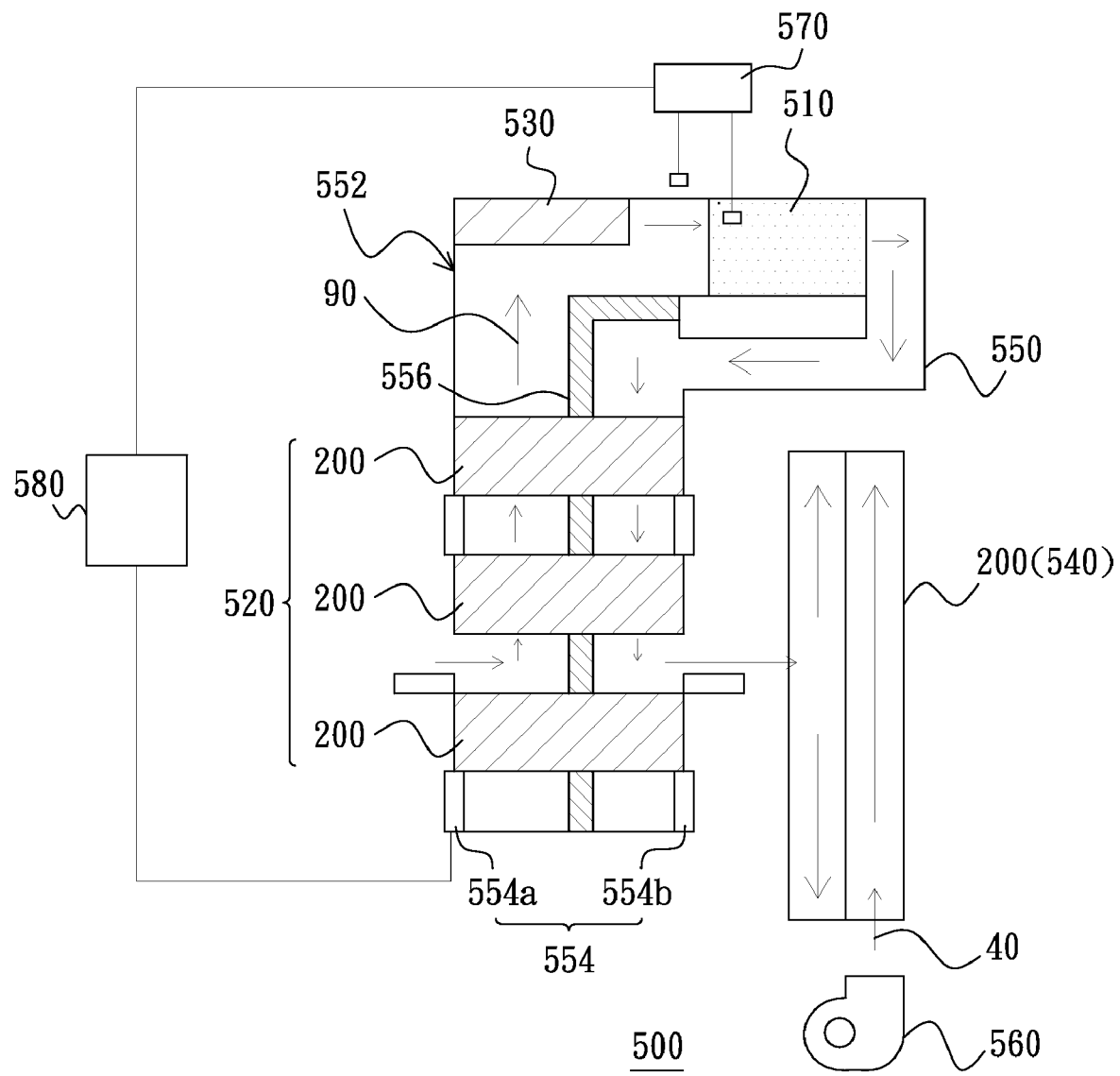
Figure 11C:
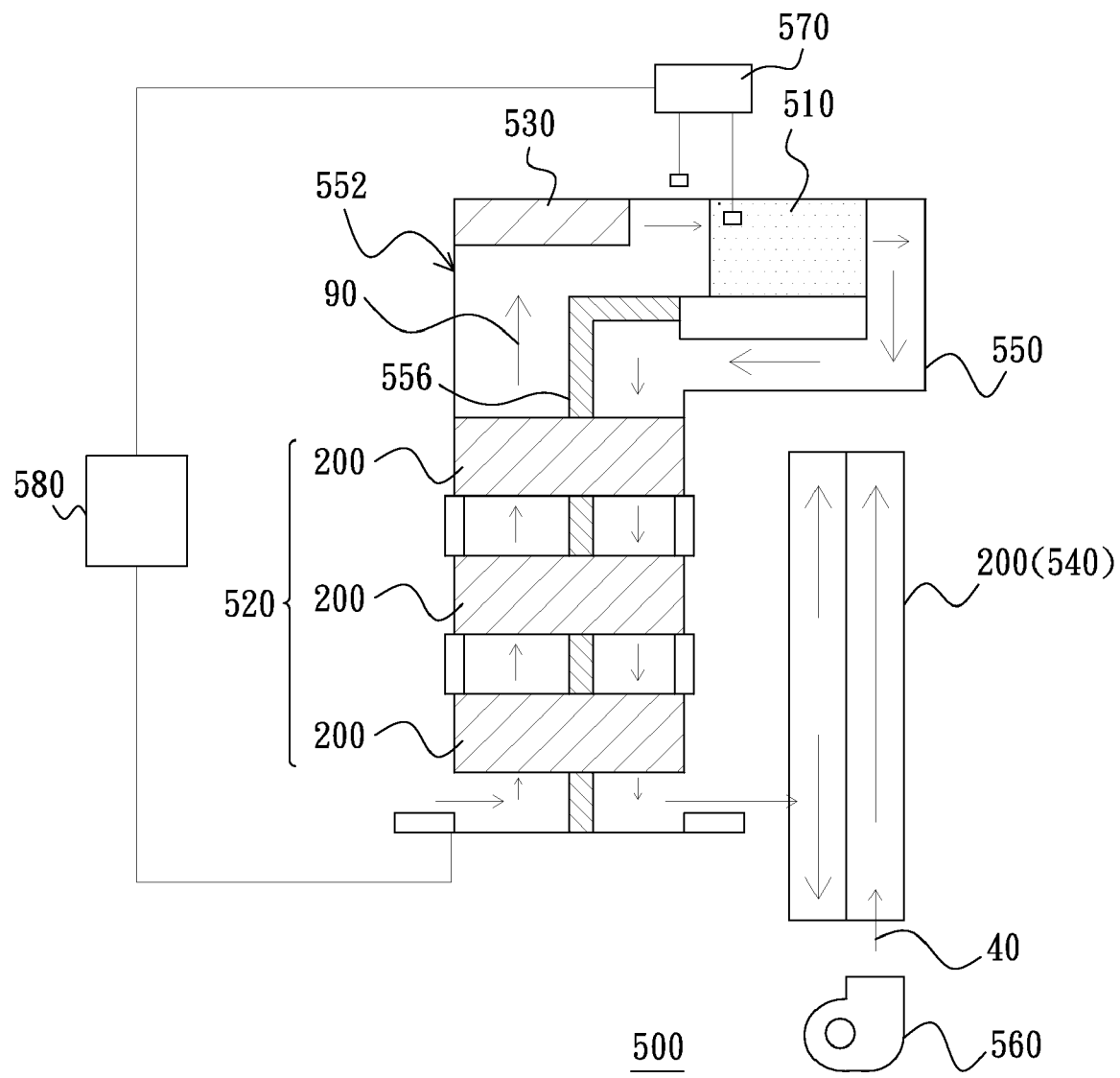

FIGS. 11A through 11C respectively shows different states of a fuel cell system in accordance with even further still another present embodiment of the present invention. As illustrated in FIGS. 11A through 11C, the fuel cell system 500 includes a fuel cell stack 510, a first heat exchanging module 520, a first airflow generator 530, a second heat exchanging module 540 and a flow guiding unit 550. The first heat exchanging module 520 includes a plurality of the above mentioned heat exchanging elements 200 (as shown in FIGS. 2 and 3), heat exchanging elements 200*a* (as shown in FIG. 5), heat exchanging elements 200*b* (as shown in FIGS. 6A and 6B) or heat exchanging elements 200*c* (as shown in FIG. 7). For the purpose of illustration, the first heat exchanging module 520 illustrated in FIGS. 11A through 11C includes a plurality of the heat exchanging elements 200. The first airflow generator 530 is arranged between the fuel cell stack 510 and the first heat exchanging module 520 and configured to supply an airflow 90 to the fuel cell stack 510. The second heat exchanging module 540 is arranged beside the first heat exchanging module 520. The second heat exchanging module 540 includes at least one of the above mentioned heat exchanging elements 200 (as shown in FIGS. 2 and 3), heat exchanging elements 200*a* (as shown in FIG. 5), heat exchanging elements 200*b* (as shown in FIGS. 6A and 6B) or heat exchanging elements 200*c* (as shown in FIG. 7). For the purpose of illustration, the second heat exchanging module 540 illustrated in FIGS. 11A through 11C includes the heat exchanging element 200. Furthermore, the first parts 210*a* (as shown in FIGS. 2 and 3) of the heat exchanging units 210 of the heat exchanging element 200 of the second heat exchanging module 540 is located adjacent to the first heat exchanging module 520.

The flow guiding unit 550 connects the fuel cell stack 510 and the first heat exchanging module 520. The flow guiding unit 550 has a plurality of valve groups 554 formed on a sidewall 552 of the flow guiding unit 550 corresponding to the respective heat exchanging elements 200 of the first heat exchanging module 520. Each of the valve groups 554 includes at least two valves 554*a*, 554*b* opposite to each other. The flow guiding unit 550 is configured to guide the airflow 90 to flow through the first heat exchanging module 520, the fuel cell stack 510, the first heat exchanging module 520 in sequence and then flow to the first parts 210*a* (as shown in FIGS. 2 and 3) of the heat exchanging units 210 of the heat exchanging element 200 of the second heat exchanging module 540 via one of the valve groups 554.

In a present embodiment, the above mentioned flow guiding unit 550 has a separation portion 556 arranged between the heat exchanging elements 200 of the first heat exchanging module 520 and between the first heat exchanging module 520 and the fuel cell stack 510. The first parts 210*a* (as shown in FIGS. 2 and 3) of the heat exchanging units 210 of the heat exchanging elements 200 of the first heat exchanging module 520 are located at a side (e.g., left side) of the separation portion 556. The second parts 210b (as shown in FIGS. 2 and 3) of the heat exchanging units 210 of the heat exchanging elements 200 of the first heat exchanging module 520 are located at another side (e.g., right side) of the separation portion 556 and adjacent to the second heat exchanging module 540. Furthermore, the above mentioned fuel cell system 500 further includes a second airflow generator 560 arranged at an end of the second heat exchanging module 540 so as to supply a cooling airflow 40 to the second parts 210b (as shown in FIGS. 2 and 3) of the heat exchanging units 210 of the heat exchanging element 200 of the second heat exchanging module 540.

The above mentioned fuel cell system 500 still further includes a detecting unit 570 and a control unit 580. The detecting unit 570 is configured to detect an ambient temperature outside of the flow guiding unit 550 and a temperature of the fuel cell stack 510. The control unit 580 electrically connects to the detecting unit 570 and the valve groups 554 to switch the on-off states of the valve groups 554 based upon a detection result from the detecting unit 570.

Generally speaking, the more the amount of the heat exchanging elements 200 the better the heat recovery efficiency. The fuel cell system 500 of the present embodiment is capable of adjusting the amount of the heat exchanging elements 200 operatively occurring heat exchange according to the ambient temperature of the fuel cell system 500. Therefore, the fuel cell system 500 is capable of providing approximately identical output power at different ambient temperatures. An operation manner of the fuel cell system 500 will be described as follows. Furthermore, the airflow has flowed through the fuel cell stack 510 will be denoted by 90' in the following context. In addition, because a heat exchange principle of the airflows 90, 90' at the location of the first heat exchanging module 520 is similar to that of the fuel cell system 300 illustrated in FIG. 3, so hereinafter only illustrating how to adjust the amount of the heat exchanging elements 200 of the first heat exchanging module 520 that operatively occur the heat exchange.

Referring to FIG. 11A, when the detecting unit 570 detects the ambient temperature is relatively high (e.g., above 25 Celsius degrees), the control unit 580 switches on the uppermost valve group 554, the airflow 90 supplied by the first airflow generator 530 flows in the flow guiding unit 550 via the left valve 554a of the uppermost valve group 554. The airflow 90 then flows to the fuel cell stack 210 after flowing through the uppermost heat exchanging element 200. Because the ambient temperature is relatively high, a temperature of the airflow 90 arrives at a predetermined range by absorbing the heat energy of only one heat exchanging element 200. Furthermore, the airflow 90' flows to the second heat exchanging module 540 via the right valve 554b of the uppermost valve group 554. The water vapor in the airflow 90' is condensed into liquid water by the second heat exchanging module 540 and whereby the purpose of water recovery is achieved. The cooling airflow 40 supplied by the second airflow generator 560 further improves the water recovery efficiency.

Referring to FIG. 11B, when the detecting unit 570 detects the ambient temperature is relatively low (e.g., in the range from 12.5 to 25 Celsius degrees), the control unit 580 switches on the valve group 554 in the middle, the airflow 90 supplied by the first airflow generator 530 flows in the flow guiding unit 550 via the left valve 554a of the middle valve group 554. The airflow 90 then flows to the fuel cell stack 510 after flowing through two heat exchanging elements 200. Because the airflow 90 absorbs the heat energy of the two heat exchanging elements 200, even if the ambient temperature is relatively low, a temperature of the airflow 90 still arrives at the predetermined range when it flows to the fuel cell stack 510.

Referring to FIG. 11C, when the detecting unit 570 detects the ambient temperature is relatively lower (e.g., in the range from 0 to 12.5 Celsius degrees), the control unit 580 switches on the lowermost valve group 554, the airflow 90 supplied by the first airflow generator 530 flows in the flow guiding unit 550 via the left valve 554a of the lowermost valve group 554. The airflow 90 then flows to the fuel cell stack 510 after flowing through the three heat exchanging elements 200. Because the airflow 90 absorbs the heat energy of the three heat exchanging elements 200, a temperature of the airflow 90 still arrives at the predetermined range when it flows to the fuel cell stack 510.

Because the fuel cell system 500 is capable of adjusting the amount of the heat exchanging elements 200 of the first heat exchanging module 520 which operatively occur heat exchange according to the ambient temperatures thereof, to make the temperatures of the airflow 90 flowing to the fuel cell stack 510 at different ambient temperatures to be approximately identical. Therefore, the reaction efficiencies of the fuel cell stack 510 at different ambient temperatures are approximately the same so as to provide a substantially identical output power.

It is noted that the forgoing presented ranges of the ambient temperature and the amount of the heat exchanging elements 200 of the first heat exchanging module 520 are only for the purposes of illustration and description, but not to limit the present invention.

In summary, the present embodiments of the present invention at least can achieve one, a part of or all the following advantages: (1) the heat exchanging elements of the present embodiments of the present invention utilize the fixing units with the low thermal conductivity coefficient to block (or slow) at least an axial heat conduction, when they are applied into counter flow systems, heat exchanging efficiencies of the counter flow systems are improved. Furthermore, the fuel cell systems using the present exchanging elements achieve a relatively high heat recovery efficiency. (2) In a present fuel cell system of the embodiments of the present invention, because a flow rate of an airflow supplied by the first airflow generator is higher than that of the airflow flowing through the fuel cell stack, such that there is enough cooling airflow is supplied and thus enough liquid water is recovered. Therefore, it is feasible to use a higher concentration of fuel (e.g., methanol) to increase a power density of the present fuel cell system. (3) Another present fuel cell system of the embodiments of the present invention is capable of adjusting the amount of the heat exchanging elements of the first heat exchanging module which operatively occur heat exchange at different ambient temperatures by switching the on-off states of the valve groups. Therefore, the reaction efficiencies of the present fuel cell system are approximately the same so as to provide the identical output powers.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fuel cell system comprising:
    a fuel cell stack;
    a first airflow generator configured to supply an airflow;
    a first heat exchanging module arranged between the fuel cell stack and the first airflow generator, wherein the first heat exchanging module comprises at least one heat exchanging element including:
        a plurality of heat exchanging units arranged to be spaced apart from one another along a first direction; and
        a fixing unit fixing the heat exchanging units, each of the heat exchanging units being demarcated into a first part and a second part extending from the first part by the fixing unit,
        wherein a thermal conductivity coefficient of each of the heat exchanging units is higher than that of the fixing unit and the fixing unit is configured to slow heat conduction between the heat exchanging units;
    a second heat exchanging module arranged between the first airflow generator and the first heat exchanging module, wherein the second heat exchanging module comprises at least one of the heat exchanging elements; and
    a flow guiding unit connecting the fuel cell stack, the first airflow generator, the first heat exchanging module and the second heat exchanging module to allow the airflow to flow through the second heat exchanging module, the first heat exchanging module, the fuel cell stack, the first heat exchanging module and the second heat exchanging module in sequence and then to flow out of the flow guiding unit, wherein the flow guiding unit has a bypass port formed in a sidewall thereof and arranged between the first heat exchanging module and the second heat exchanging module, and the bypass port is configured to guide a part of the airflow flowing from the second heat exchanging module to the first heat exchanging module out of the flow guiding unit.

2. The fuel cell system according to claim 1, further comprising a second airflow generator, the second airflow generator connected to the flow guiding unit and arranged between the fuel cell stack and the first heat exchanging module.

3. The fuel cell system according to claim 2, wherein the flow guiding unit has a separation portion arranged between the first airflow generator and the fuel cell stack, the first parts of the heat exchanging units of the heat exchanging elements of the first and the second heat exchanging modules are located at a side of the separation portion, the second parts of the heat exchanging units of the heat exchanging elements of the first and the second heat exchanging modules are located at another side of the separation portion, the airflow flowing from the first airflow generator to the fuel cell stack flows through the first parts, and the airflow flowing from the fuel cell stack to outside of the flow guiding unit flows through the second parts.

4. The fuel cell system according to claim 3, wherein an amount of the heat exchanging elements of the first heat exchanging module is multiple.

5. The fuel cell system according to claim 4, further comprising a heater arranged beside the second airflow generator and configured to heat the airflow.

6. The fuel cell system according to claim 5, wherein the flow guiding unit further has a valve secured at an opening of the separation portion, and the opening is located between two heat exchanging elements of the first heat exchanging module adjacent to the fuel cell stack.

7. The fuel cell system according to claim 6, further comprising:
    a detecting unit configured to detect an oxygen content of the airflow flowing to the fuel cell stack, a temperature of the fuel cell stack and an ambient temperature outside of the flow guiding unit; and
    a control unit electrically connected to the detecting unit, the heater, the valve, the first airflow generator and the second airflow generator and configured to switch on-off states of the heater, the valve, the first airflow generator and the second airflow generator based upon a detection result from the detecting unit.

8. The fuel cell system according to claim 3, wherein the separation portion is made of a plastic, a foam or a silicon rubber.

9. The fuel cell system according to claim 2, wherein the second airflow generator comprises a blower, an axial fan or a pump.

10. The fuel cell system according to claim 1, wherein the first airflow generator comprises a blower, an axial fan or a pump.

* * * * *